United States Patent
Bostwick

(10) Patent No.: US 6,514,052 B2
(45) Date of Patent: Feb. 4, 2003

(54) TWO SIDED RADIAL FAN FOR MOTOR COOLING

(75) Inventor: Peter K. Bostwick, Maryland Heights, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/822,568

(22) Filed: Mar. 30, 2001

(65) Prior Publication Data
US 2002/0141888 A1 Oct. 3, 2002

(51) Int. Cl.[7] .................................................. F04B 39/06
(52) U.S. Cl. .................. 417/366; 417/423.14; 416/189; 416/194
(58) Field of Search ........................... 417/366, 423.14; 416/189, 194, 195, 198 R, 234, 241 A, 187; 415/101–108

(56) References Cited

U.S. PATENT DOCUMENTS

| | | | |
|---|---|---|---|
| 1,926,225 A | | 9/1933 | Birmann |
| 2,293,590 A | * | 8/1942 | Chance ....................... 209/250 |
| 2,654,529 A | | 10/1953 | Smith |
| 2,859,933 A | | 11/1958 | Whitaker |
| 3,464,622 A | * | 9/1969 | Dennis ....................... 416/178 |
| 3,521,973 A | * | 7/1970 | Schouw ....................... 416/185 |
| 3,730,642 A | | 5/1973 | Barnstead et al. |
| 4,060,337 A | | 11/1977 | Bell, III |
| 4,093,401 A | | 6/1978 | Gravelle |
| 4,167,369 A | | 9/1979 | Ishihara |
| 4,236,443 A | | 12/1980 | Schossow |
| 4,819,884 A | * | 4/1989 | Wiley ........................... 241/39 |
| 5,060,720 A | | 10/1991 | Wollaber et al. |
| 5,375,651 A | | 12/1994 | Colwell |
| 5,431,216 A | * | 7/1995 | Ogushi et al. ............... 165/122 |
| 5,478,275 A | | 12/1995 | Malm |
| 5,814,908 A | | 9/1998 | Muszynski |
| 6,059,541 A | * | 5/2000 | Beckey et al. ............... 417/295 |
| 6,435,828 B1 | * | 8/2002 | Bosywick ................... 416/175 |

* cited by examiner

Primary Examiner—Charles G. Freay
Assistant Examiner—John F Belena
(74) Attorney, Agent, or Firm—Thompson Coburn LLP

(57) ABSTRACT

A two sided radial fan draws cooling air into axially opposite ends of a dynamoelectric device drawing the flow of air into one axial end of the device and directing the flow of air over the device exterior surface, and drawing a second flow of air into an opposite axial end of the device and through the interior of the device before redirecting the second flow of air over the exterior of the device. The two sided fan thereby provides greater cooling efficiency to the device without significantly increasing the size of the fan or the device and without significantly increasing the costs or adding additional components to the device construction.

36 Claims, 6 Drawing Sheets

TWO SIDED RADIAL FAN FOR MOTOR COOLING

BACKGROUND OF THE INVENTION (1) Field of the Invention

The present invention pertain's to fans of the type mounted on the shafts of electric motors and other similar dynamoelectric devices for cooling such devices during operation. More specifically, the present invention pertains to a radial fan having two sets of blades on axially opposite sides of the fan. On rotation of the fan, the first set of blades draws air in a first direction axially toward the center of the fan and then pushes the air radially outward which then is redirected axially by an end shield over the exterior of the fan, motor, thereby cooling the exterior of the motor stator. Also on rotation of the fan, the second set of blades draws a flow of air in a second, opposite direction axially toward the center of the fan through the stator, thereby cooling the stator windings. The second set of blades then redirects the airflow back over the exterior of the stator assisting in the cooling of the stator exterior. The two sets of blades on the axially opposite sides of the fan improve its cooling efficiency without increasing its size, thereby providing a greater cooling capacity over conventional radial fans of the same size.

(2) Description of the Related Art

Many dynamoelectric devices such as appliance motors for dishwashers, clothes washers and whirlpool baths utilize fans mounted on their rotor shafts to provide for air cooling of the stators and the rotors of the motors during their operation. Typically, such a fan is mounted internally at one axial end of the electric motor and is configured to pull or push air through the housing of the motor between the rotor and stator, thereby cooling the motor. The fan can also be mounted on the shaft of the motor outside the motor housing and is covered by a fan shield. On operation of the motor, rotation of the fan draws air into the fan shield and then pushes the air radially outward. The fan shield then redirects the flow of air axially over the exterior of the motor.

A typical electric motor is generally cylindrical in shape and its fan is commonly configured to have nearly the same diameter as the device housing. It is also common for the motor to have a cover enclosing the fan, or to place the fan within the housing of the motor to prevent objects from contacting the fan blades.

Additionally, it is generally desirable to configure the cooling fan in a manner such that it takes only a minimum of space so that it can fit compactly within the housing of the motor.

Many machines in which electric motors operate allow for the use of axial flow fans. However, the configurations of many machines in which electric motors are used often necessitate the use of radial flow fans which discharge air radially outward. Radial flow fans are designed to obtain maximum air flow rates for a given configuration. Other design considerations for the use of radial flow fans include costs and whether the fan must operate in opposite directions of rotation.

One of the simplest radial flow fan designs is a straight blade fan. Straight blade fans utilize a plurality of blades that extend radially outward from a central motor shaft hub of the fan. Like other fan designs, the hub is typically a cylindrical body having a through hole for mounting the fan to the shaft of a dynamoelectric device. The blades of a straight blade radial fan are typically flat, rectangular members oriented parallel to the axis of rotation of the fan so that they will push air radially outward from the fan purely by centrifugal force. The fans are typically mounted on the shaft of the dynamoelectric device at one axial end of the shaft and draw or push air through the axially opposite end of the device on rotation of the fan. The air drawn through the device cools its stator as the air is drawn to the fan at the opposite end of the device. The cooling air is then pushed radially outward from the device housing by the fan. To reduce the amount of air drawn into the radial fan from the side of the device housing at which the fan is mounted, radial fans often have a disc shaped backing wall that rotates with the blades of the fan and blocks the flow of air into the fan from the side of the device at which the fan is mounted. In this way the backing wall increases the amount of air drawn into the device housing from the end of the housing axially opposite the fan. Generally, straight blade radial fans produce a greater air flow rate than axial flow fans or other types of fans, for example backward curved blade fans of the same size. For this reason, straight blade radial fans are desirable for use in cooling most dynamoelectric devices.

Although radial flow fans have proven effective for cooling dynamoelectric devices, it remains advantageous to design fans having ever greater efficiency. Furthermore, it is desirable to increase the cooling efficiency or motor cooling ability of such fans without increasing the size of the fans and without significantly increasing the cost or adding additional components to the dynamoelectric device assembly.

SUMMARY OF THE INVENTION

The radial fan of the present invention increases the flow rate of cooling air through a dynamoelectric device with which it is used as compared to prior art straight blade radial fans of the same size. The increased air flow is a result of the fan being comprised of two sets of blades that are positioned on axially opposite sides of a center plate of the fan, as well as the configuration of an annular ring joining the distal ends of one set of blades.

The fan of the preferred embodiment of the invention is designed for use with a dynamoelectric device that rotates its rotor shaft in one direction or in two directions. The fan is made more effective by its being designed with two sets of blades, where each set of blades draws in cooling air to the dynamoelectric device from the axially opposite ends of the device.

As with conventional straight blade radial fans, the two sided radial fan of the invention is provided with a center hub that connects the fan to the shaft of the dynamoelectric device at one of the axially opposite ends of the device. Extending radially outward from the hub are a first plurality of blades and a second plurality of blades that are positioned on axially opposite sides of the fan. The fan is mounted on the dynamoelectric device shaft with the second plurality of blades adjacent the device and with the first plurality of blades positioned on the axially opposite side of the second plurality of blades from the device.

A radially oriented plate having axially opposite first and second surfaces separates the first plurality of blades from the second plurality of blades. The plate has a circular perimeter edge and a circular inner edge adjacent the fan hub. The first plurality of blades extend radially straight across the first surface of the plate to distal ends of the blades that are spaced radially outward from the plate perimeter edge. The second plurality of blades extend radially straight across the second surface of the plate to distal ends of the blades spaced radially outward from the plate perimeter edge. The distal ends of the first plurality of blades are angled relative to the fan axis of rotation and merge with the distal ends of the second plurality of blades.

An annular ring connects the second plurality of blades adjacent their distal ends. Because the distal ends of the second plurality of blades extend radially outward from the plate perimeter edge, the annular ring is also spaced radially outward from the plate perimeter edge. The annular ring has an oblique cross section relative to the axis of rotation of the fan and tapers or angles radially outward from the axis of rotation as the ring extends axially away from the first plurality of blades.

Because the two sided radial fan of the invention can operate in two directions of rotation, it advantageously can be mounted to the shaft of the dynamoelectric device at either axial end of the device. On rotation of the fan by the shaft of the device, the first plurality of blades function as straight radial fan blades forcing a flow of air centrifugally from the center of the fan radially outward along the blades toward the blade distal ends. This creates a vacuum at the center of the fan that draws an axial flow of air in a first direction into the fan toward the fan first surface. The radial flow of air toward the distal ends of the first plurality of blades is first directed against the interior surface of the electromotive device housing, and is then directed by the interior surface to flow axially through the housing from the end of the housing with the fan to the axially opposite end of the housing, thereby cooling the electromotive device at its exterior.

The rotation of the fan by the shaft of the electromotive device also causes the second plurality of blades to centrifugally force air radially outward toward the distal ends of the blades. This creates a vacuum at the center of the fan adjacent the fan second surface. This vacuum draws air axially into the electromotive device from the end of the device axially opposite the fan. This cooling air is drawn through the center of the electromotive device to the vacuum created at the center of the second surface of the fan plate. The air drawn through the electromotive device to the center of the plate second surface is then pushed radially outward along the second plurality of fan blades. This flow of air is directed toward the interior surface of the annular ring connecting the second plurality of blades. The annular ring interior surface redirects the flow of air in an axially opposite direction out over the stator windings of the electromotive device, thereby further cooling the electromotive device. Thus, the radial flow of air created by the fan is split with a first portion of the air flow pushed by the first plurality of blades being redirected by the end shield interior surface to flow axially over the exterior of the electromotive device and a second portion of the air flow pushed by the second plurality of blades being redirected by the annular ring to flow axially over the stator windings of the device to thereby cool the device.

In the manner described above, the two sided radial fan of the invention draws cooling air into the electromotive device from the axially opposite ends of the electromotive device, where in prior art cooling fans cooling air is only drawn into one of the axially opposite ends of the electromotive device. By drawing cooling air into both of the axially opposite ends of the electromotive device, the two sided radial fan of the invention provides greater cooling efficiency to the electromotive device without significantly increasing the size of the fan or the device and without significantly increasing the cost or adding additional components to the electromotive device construction.

BRIEF DESCRIPTION OF THE DRAWINGS

Further features of the invention are revealed in the following detailed description of the preferred embodiment of the invention and in the drawing figures wherein.

DETAILED DESCRIPTION OF THE PREFERRED EMBODIMENT

Figure 1:
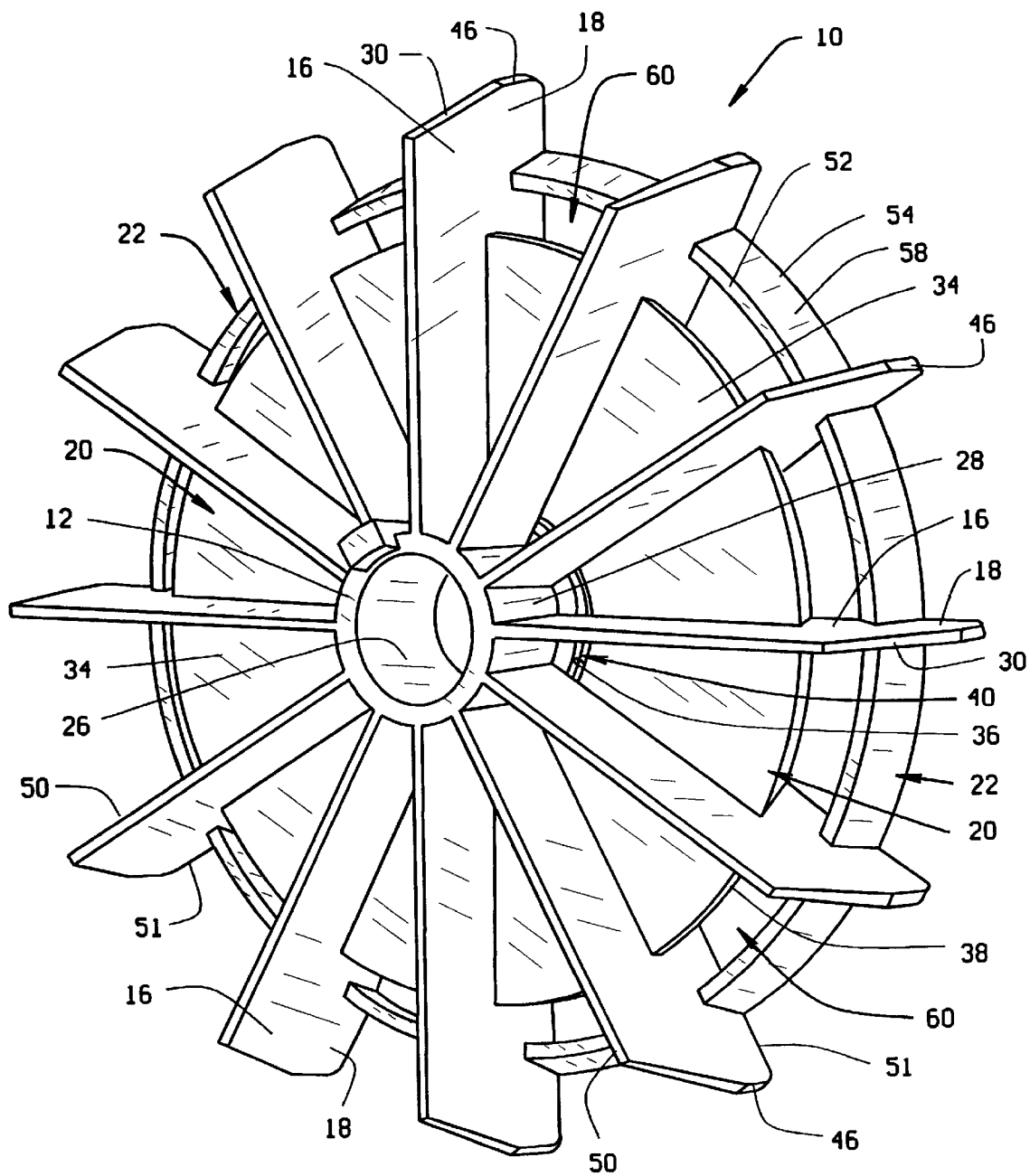
FIG. 1 is perspective view of a first side of the two sided radial fan of the invention.

The two sided radial fan 10 of the invention is shown in FIGS. 1–5 and is basically comprised of a center hub 12 having a center axis of rotation 14, a first plurality of fan blades 16 secured to and extending radially outwardly from the center hub 12, a second plurality of blades 18 extending axially from the first plurality of blades and radially from the hub, a radially oriented plate 20 separating the first plurality of blades 16 from the second plurality of blades 18, and an annular ring 22 concentric to the hub 12 and intersecting the second plurality of blades 18. In the preferred embodiment of the invention the hub, the first and second pluralities of blades, the center plate and the annular ring are formed as one monolithic piece, preferably by being molded of a plastic material. However, other methods of constructing the two sided radial fan may be employed.

The two sided radial fan is constructed so that, in use, the second plurality of blades 18 are positioned immediately adjacent the dynamoelectric device with which the fan is used and the first plurality of blades 16 are positioned on an axially opposite side of the fan from the dynamoelectric device.

As with conventional straight blade radial fans, the two sided radial fan 10 employs the cylindrical center hub 12 to connect the fan to the shaft of a dynamoelectric device at one of the axially opposite ends of the device. The hub 12 has a cylindrical interior surface 26 and a cylindrical exterior surface 28. The interior diameter of the hub interior surface 26 is dimensioned to enable it to be easily slip fit in friction engagement over the shaft of the dynamoelectric device with which it will be used. The hub 12 may be keyed to the shaft or clamped to the shaft or secured against rotation to the shaft by any of the known methods of securing a fan to a shaft.

The first plurality of blades 16 connect with the hub exterior surface 28 and radiate outwardly from the exterior surface. Each of the blades of the first plurality 16 are flat, have generally rectangular cross sections and are parallel to the center axis 14 of the fan. The first plurality of blades 16 extend straight, radially outward from the hub 12 to distal edges 30 of the blades. The first plurality of blades 16 are connected with and extend radially across a first surface 34 of the center plate 20.

The center plate has a circular interior edge 36 that surrounds and is spaced axially outward from the center hub 12. The center plate extends radially outward from its interior edge 36 to a circular, outer peripheral edge 38 of the plate. The center plate does not extend radially outward the full extent of the first plurality of blades 16 and the distal edges 30 of the first plurality of blades are all spaced radially outward from the center plate peripheral edge 38. The first plurality of blades 16 connect the center plate 20 to the hub 12 with there being a void 40 or opening left between adjacent blades of the first plurality of blades 16 and the hub exterior surface 28 and the plate interior edge 36. When the fan center hub 12 is mounted on a shaft of a dynamoelectric device, the center plate first surface 34 faces axially away from the device and its opposite second surface 42 faces axially toward the device.

Figure 2:
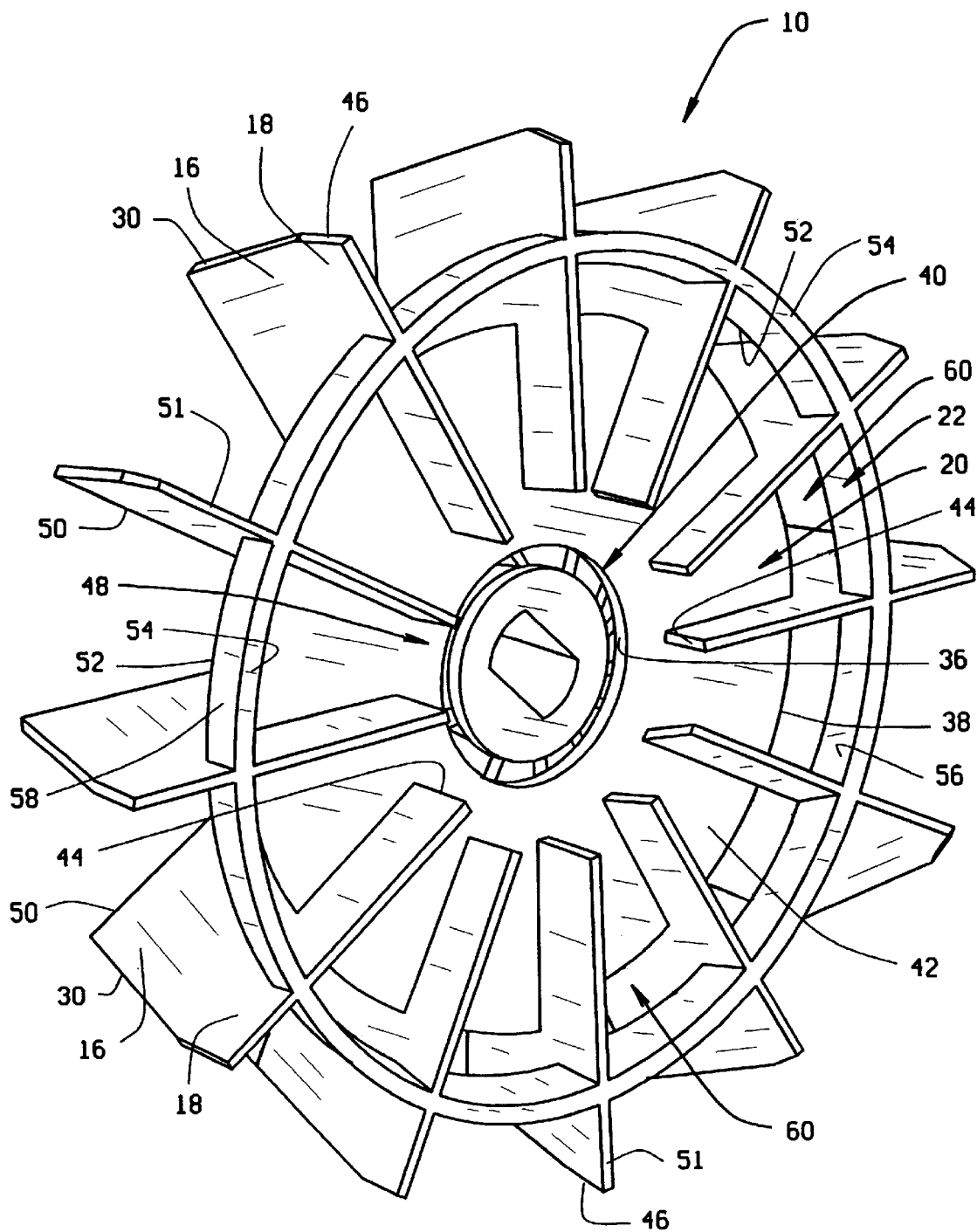
FIG. 2 is a perspective view of the second side of the fan.
Figure 3:
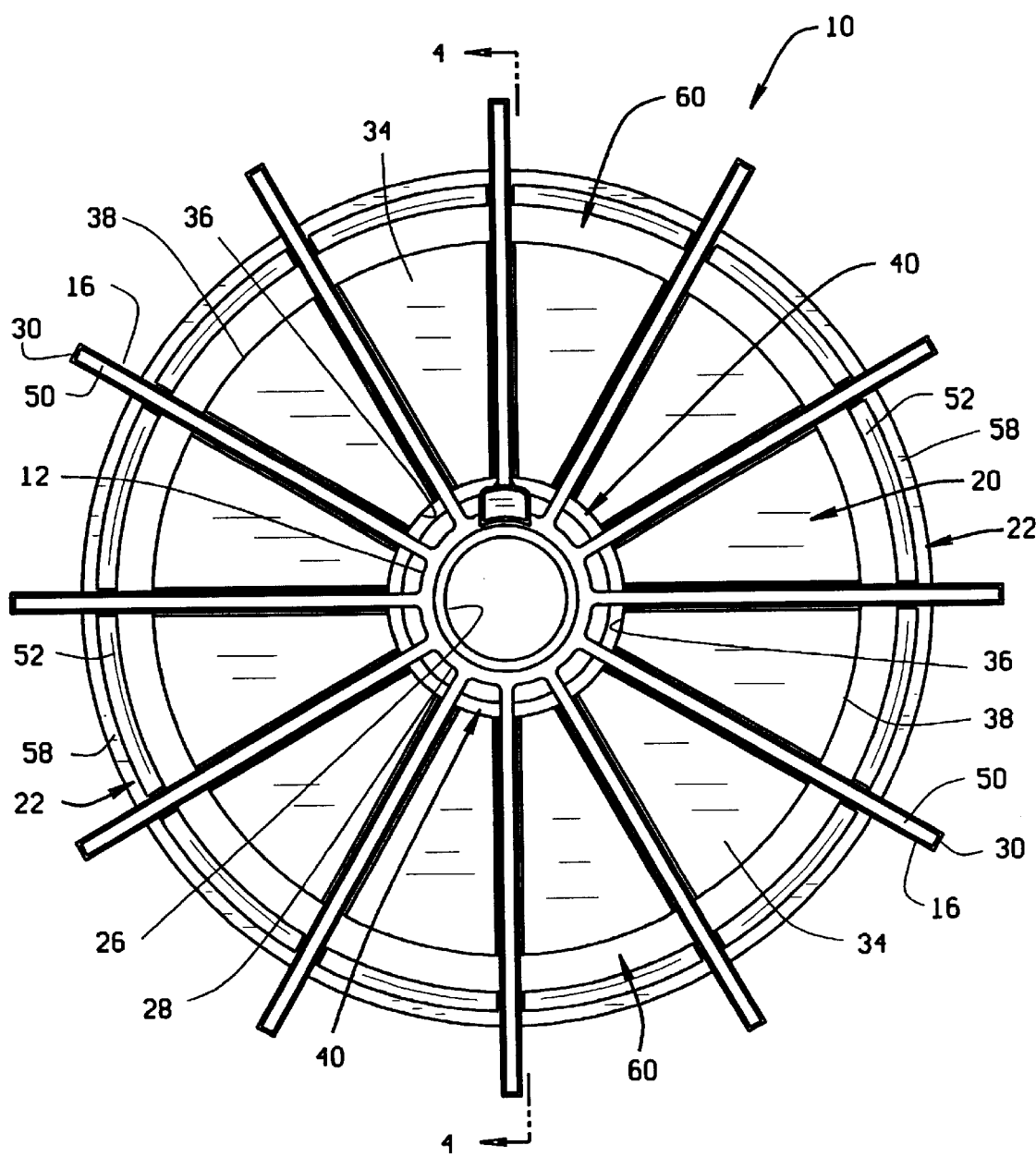
FIG. 3 is a front elevation view of the fan.
Figure 4:
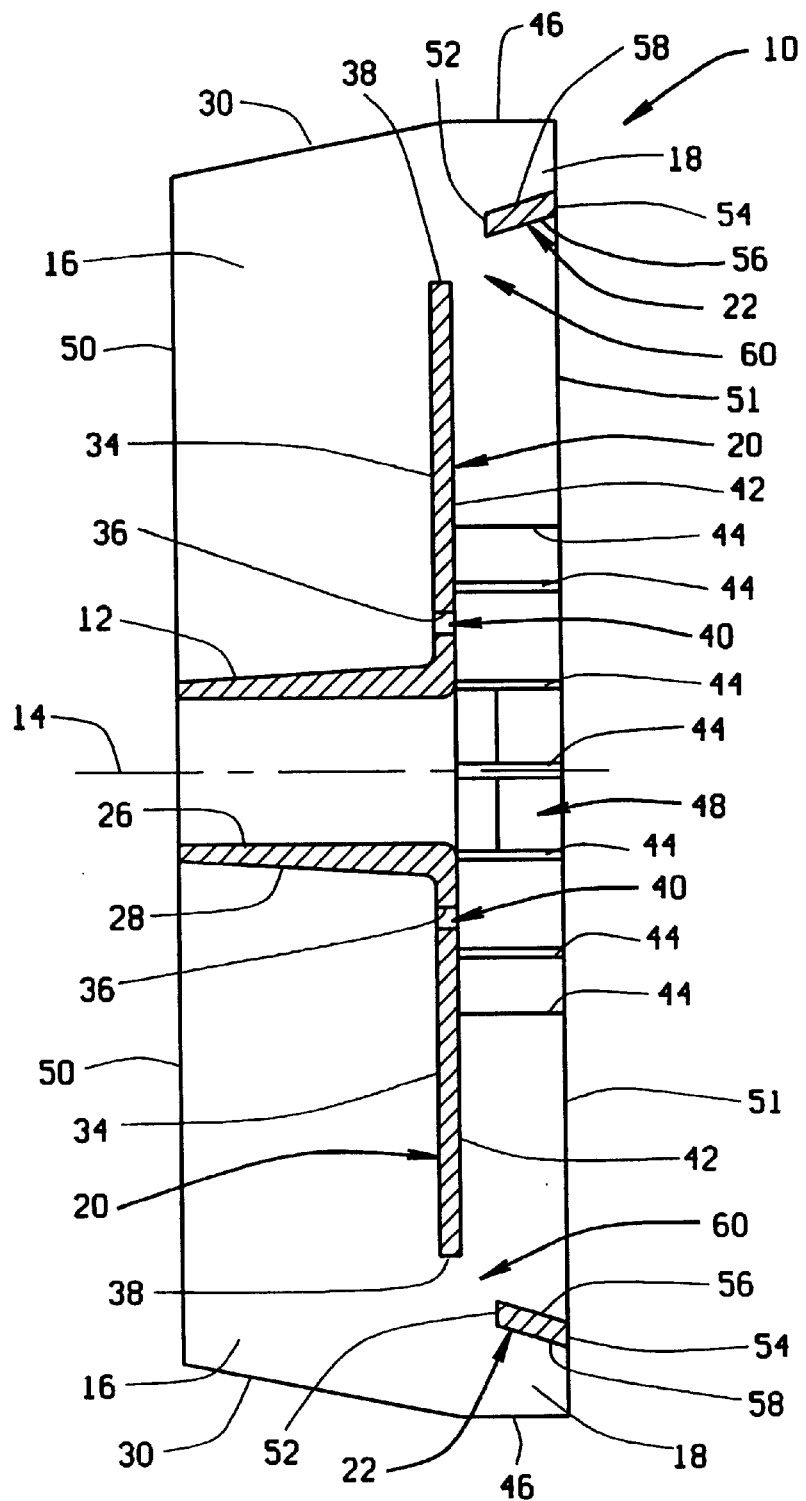
FIG. 4 is a right side elevation view of the fan, the left side being a mirror image.
Figure 5:
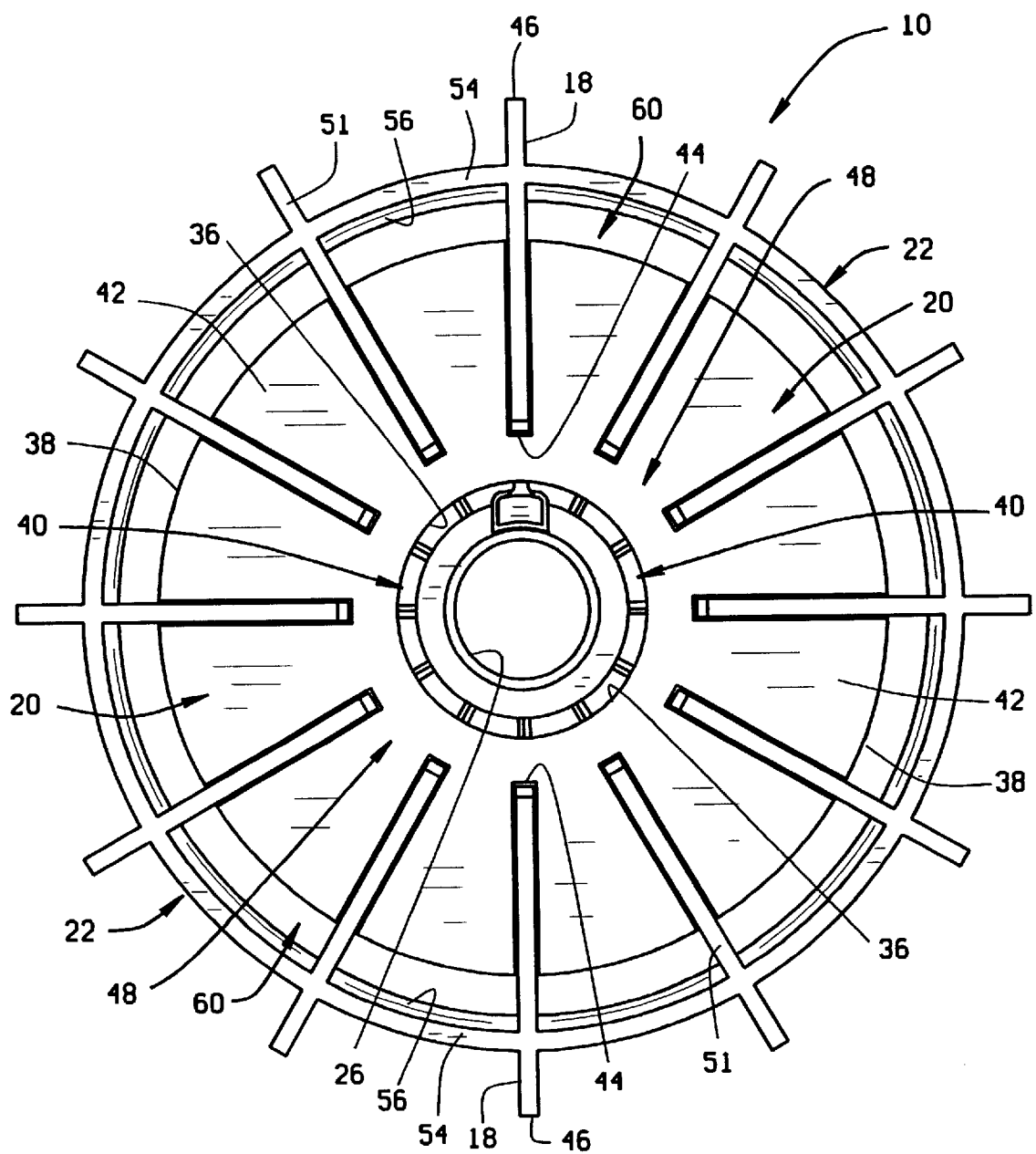
FIG. 5 is a rear elevation view of the fan.

The second plurality of blades 18 are axial extensions of the first plurality blades 16 and are connected with and extend axially outward across the center plate second surface 42 on the opposite side of the center plate from the first plurality of blades 16. The second plurality of blades 18, like the first plurality of blades, project straight, radially outward from the fan center axis 14 and have generally rectangular cross sections. However, as best seen in FIGS. 2, 4 and 5, the center hub 12 does not extend through the center plate 20 and the second plurality of blades 18 do not extend radially toward the center axis 14 to the same extent as the first plurality of blades 16, but terminate at interior or proximal edges 44 of the second plurality of blades. Each of the second plurality of blades extend straight radially outward from their interior edges 44 to distal edges 46 of the second plurality of blades that merge with the distal edges 30 of the first plurality of blades. As best seen in FIG. 4, the distal edges 46 of the second plurality of blades are positioned adjacent the dynamoelectric device with which the fan is used and are generally parallel to the center axis of rotation 14. The distal edges 46 of the second plurality of blades merge into the distal edges 30 of the first plurality of blades which taper toward the center axis 14 as they extend to the left as viewed in FIG. 4 to the outer ends of the first plurality of blades 16 that are furthest from the dynamoelectric device. The radial spacing of the interior or proximal edges 44 of the second plurality of blades from the center axis 14 creates a void 48 adjacent the center of the fan and the fan second surface 42 that may accommodate a bearing supporting the shaft of the dynamoelectric device.

The first 16 and second 18 pluralities of blades together form combined blades of the fan having axial dimensions between first 50 and second 51 edges of the combined blades that are larger than an axial dimension of the ring 22 between first 52 and second 54 edges of the ring.

The annular ring 22 extends around the fan center axis 14 intersecting with only the second plurality of blades 18. The ring 22 does not intersect with the first plurality of blades 16 and is positioned entirely on the opposite side of the center plate 20 from the first plurality of blades 16. As best seen in FIG. 4, the annular ring 22 has a cross section that angles obliquely away from the fan center axis 14 as it extends axially away from the center plate second surface 42 from the first edge 52 of the ring to the second edge 54 of the ring. The ring has opposite interior 56 and exterior 58 surfaces that extend between its two edges. The annular ring 22 is also spaced radially outward from the outer peripheral edge 38 of the center plate. This leaves a plurality of outer voids 60 between adjacent blades of the first and second plurality of blades 16, 18 and between the plate peripheral edge 38 and the annular ring 22.

Figure 6:
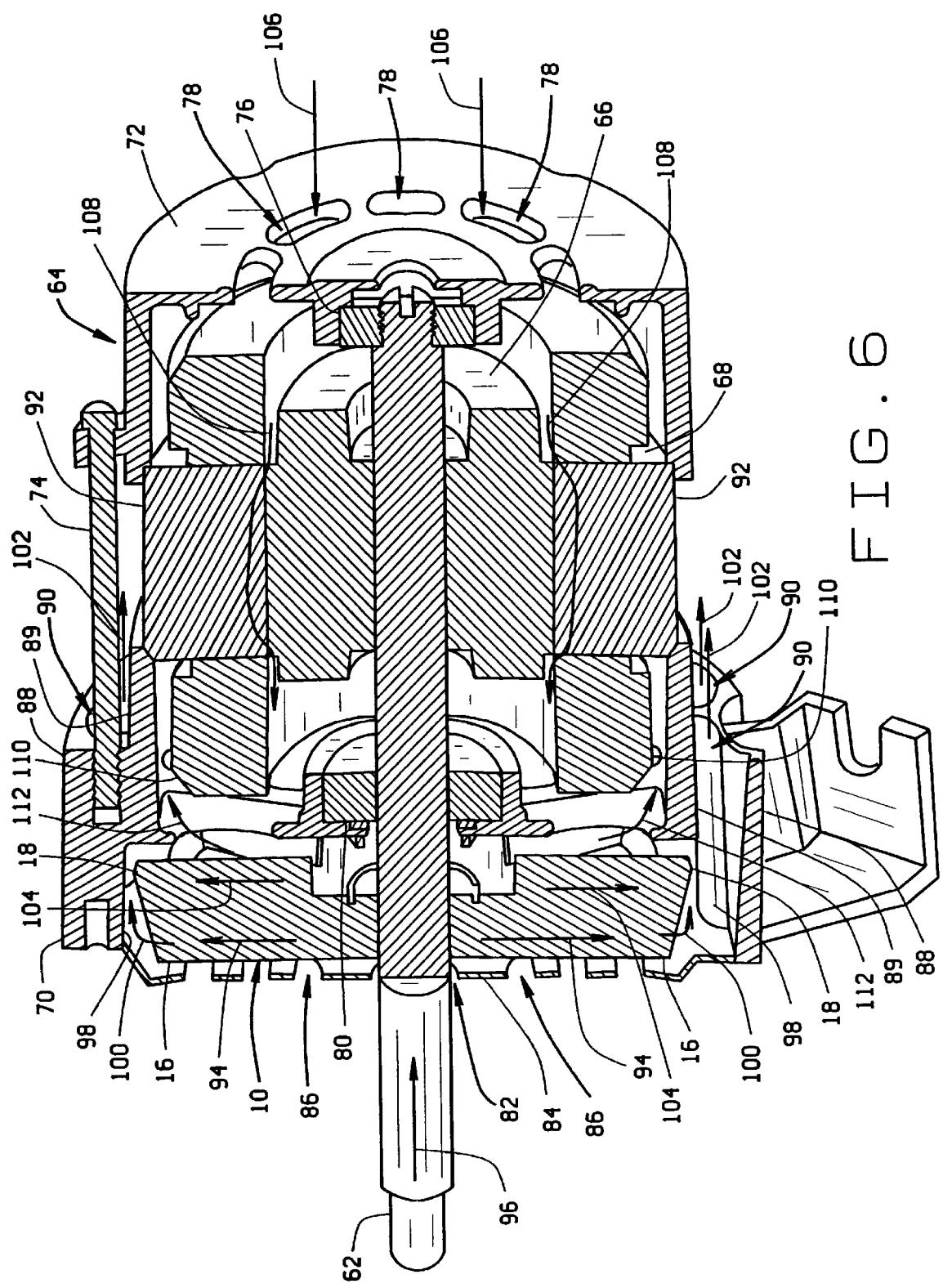
FIG. 6 is a perspective, sectioned view of the fan mounted on a shaft of a dynamoelectric device.

Because the two sided radial fan 10 can operate in two directions of rotation, it advantageously can be mounted to the shaft of a dynamoelectric device at either axial end of the device. FIG. 6 shows the two sided radial fan 10 mounted to the shaft 62 of a dynamoelectric device 64 with the first plurality of blades 16 positioned on the opposite side of the center plate 20 from the device 64 and the second plurality of blades 18 positioned on the same side of the center plate 20 as the device. For the purpose of explaining the operation of the two sided radial fan 10, the dynamoelectric device 64 shown in FIG. 6 is an electric motor 64. However, the fan of the invention may be used to cool virtually any type of device having a rotating shaft.

The electric motor 64 is basically comprised of a rotor 66 mounted on the shaft 62, a stator assembly 68 surrounding the rotor, and first 70 and second 72 end shields connected to the axially opposite ends of the stator. Threaded fasteners 74 extend between the end shields and are tightened to cause the end shields to tightly grip the stator 68 between the end shields. The first end shield 70 has a novel construction designed for use with the fan 10 of the invention as will be explained.

As best seen in FIG. 6, the second end shield 72 is at the rearward end of the electric motor, or the end from which the shaft 62 does not extend. The second end shield 72 supports a bearing 76 mounted on the end of the shaft. A plurality of vent openings 78 pass through the second end shield 72 and are arranged in a circular pattern around the bearing 76.

The first end shield 70 also supports a bearing 80 mounted on the shaft 62. However, the bearing 80 is supported in an interior portion of the end shield between the fan 10 and the motor 64. To the left of the bearing as viewed in FIG. 6, the shaft 62 passes through a shaft opening 82 in the center of an end wall 84 of the first end shield. The end wall 84 is also provided with a plurality of vent openings 86 that are arranged in a circular pattern around the shaft 62. The first end shield 70 also has a cylindrical side wall 88 that surrounds the fan 10 and an inner cylindrical wall 89 that surrounds the annular ring 22 and engages with an end of the motor stator 68. The cylindrical side wall 88 is provided with a plurality of vent channels 90 at its periphery. The vent channels 90 are positioned radially outward from the inner cylindrical wall 89 and the exterior surface of the stator 68.

On rotation of the fan 10 by the shaft 62 of the electric motor, the first plurality of blades 16 force a flow of air centrifugally from the center of the fan radially outward along the blades toward the blade distal edges 30 as represented by the arrow 94 in FIG. 6. This creates a vacuum at the center of the fan adjacent its mounting to the shaft 62 and the vacuum draws an axial flow of air in a first direction, represented by the arrow 96, into the center of the fan toward the fan first surface 34. The axial flow of air 96 in the first direction is drawn into the fan 10 through the vent openings 86 of the first end shield 70 and then is forced radially outward along the first plurality of fan blades 16 toward the distal edges 30 of the blades. The radial flow of air 94 toward the distal edges of the first plurality of fan blades is first directed against the interior surface 98 of the first end shield 70, and then is directed by the interior surface to flow axially through the housing in the first direction as represented by the arrows 100. This redirected flow of air 100 is directed through the vent channels 90 of the first end shield 70 and over the exterior surface 92 of the stator 68 as represented by the arrows 102, thereby cooling the exterior surface of the stator.

The rotation of the fan 10 by the shaft 62 of the motor also causes the second plurality of blades 18 to centrifugally force air radially outward along the blades toward their distal edges 46 as represented by the arrows 104. The flow of air radially outward along the second plurality of blades creates a vacuum at the center of the fan adjacent the shaft 62 and the second fan surface 42. This vacuum is transmitted through the interior of the motor 64 and draws air through the vent openings 78 of the second end shield 72 into the motor interior as represented by the arrows 106. As represented by the arrows 108, the air is drawn axially in a second direction, opposite the first direction represented by the arrows 96, through the windings of the stator 68 toward the center of the fan at the fan second surface 42. This flow of air through the motor cools the stator windings as well as the bearings 80, 76 supporting the motor shaft 62. The air drawn through the motor to the center of the fan second plate surface 46 is then pushed radially outward along the second plurality of fan blades 18. A portion of this radial flow of air is directed between the center plate second surface 42 and the annular ring 22 and mixes with the flow of air directed across the first end shield interior surface 98 and over the exterior of the stator 102 cooling the stator exterior. A portion of the radial flow of air across the fan second surface 42 is also directed toward the interior surface 56 of the annular ring. The annular ring interior surface 56 redirects this portion of the radial flow of air in an axially opposite direction inside the end shield inner cylindrical wall 89 and out over the end turns 110 of the stator windings and between the first end shield 70 and the stator 68 as represented by the arrows 112, thereby further cooling the stator.

In the manner described above, the two sided radial fan draws cooling air into the dynamoelectric device 64 from the axially opposite ends of the device, where in prior art cooling fans cooling air is only drawn into one of the axially opposite ends of the device. By drawing cooling air into both of the axially opposite ends of the device, the two sided radial fan of the invention provides greater cooling efficiency to the device without significantly increasing the size of the fan or the device and without significantly increasing the cost or adding additional components to the device construction.

While the present invention has been described by reference to specific embodiments, it should be understood that modifications and variations of the invention may be constructed without departing from the scope of the invention defined in the following claims.

What is claimed:

1. A fan having a center axis of rotation, the center axis defining axial and radial directions, the fan comprising: a first plurality of blades on a first axial side of the fan, the first plurality of blades each extending radially straight from the center axis to push air radially outwardly and draw a flow of air in a first direction axially toward the first axial side of the fan on rotation of the fan; and, a second plurality of blades on a second axial side of the fan that is opposite the first axial side of the fan, the second plurality of blades each extending radially straight from the center axis to push air radially outwardly and draw a flow of air in a second direction, opposite the first direction axially toward the second axial side of the fan on rotation of the fan; and, an annular ring intersecting the plurality of blades, the annular ring having axially opposite first and second edges and a cross-section that angles obliquely away from the center axis as the cross-section extends from the first edge of the ring to the second edge of the ring.

2. A fan having a center axis of rotation, the center axis defining axial and radial directions, the fan comprising: a first plurality of blades on a first axial side of the fan, the first plurality of blades being configured to draw a floe of air in a first direction axially toward the first axial side of the fan on rotation of the fan; and a plate separating the first plurality of blades from the second plurality of blades wherein a second plurality of blades extending radially outward to distal ends of the second plurality of blades; and, a ring connects the second plurality of blades.

3. The fan of claim 2, wherein:

the ring has an oblique cross section relative to the axis of rotation that extends radially outward from the axis of rotation as it extends axially away from the first plurality of blades.

4. The fan of claim 3, wherein:

a plurality of voids pass between adjacent blades of the second plurality of blades and radially within the ring.

5. The fan of claim 2, wherein:

the first plurality of blades are also configured to push a flow of air radially outward away from the axis of rotation on rotation of the fan; and, the second plurality of blades are also configured to push a flow of air radially outward away from the axis of rotation on rotation of the fan.

6. The fan of claim 2, wherein:

a plate is positioned between the first and second pluralities of blades, the plate has axially opposite first and second surfaces;

the first plurality of blades extend across the first surface of the plate; and, the second plurality of blades extend across the second surface of the plate.

7. The fan of claim 6, wherein:

the plate is circular and has a circular perimeter edge; and, the ring is spaced radially outward from the plate perimeter edge.

8. The fan of claim 7, wherein:

a plurality of voids pass between adjacent blades of the second plurality of blades and between the ring and the plate perimeter edge.

9. The fan of claim 2, wherein:

the first plurality of blades are straight, radial blades and the second plurality of blades are straight, radial blades.

10. The fan of claim 2, wherein:

the first plurality of blades, the second plurality of blades and the ring are one monolithic piece.

11. The fan of claim 2, wherein:

the first plurality of blades extend radially from a center shaft hub.

12. A fan having a center axis of rotation, the center axis defining axial and radial directions, the fan comprising:

a radially oriented plate having axially opposite first and second surfaces;

a first plurality of blades on the first surface of the plate, the first plurality of blades being configured to draw a flow of air axially toward the first surface of the plate on rotation of the fan;

a second plurality of blades on the second surface of the plate, the second plurality of blades being configured to draw a flow of air axially toward the second surface of the plate on rotation of the fan; and, a ring connects the second plurality of blades and the ring is spaced radially outward from the plate leaving a void between the ring and the plate.

13. The fan of claim 12, wherein:

the first plurality of blades are also configured to push a flow of air radially outward away from the first surface of the plate; and, the second plurality of blades are also configured to push a flow of air radially outward away from the second surface of the plate.

14. A fan having a center axis of rotation, the center axis defining axial and radial directions, the fan comprising: a radially oriented plate having axially opposite first and second surface; a first plurality of blades being configured to draw a flow of air axially toward the first surface of the plate on rotation of the fan; a second plurality of blades being configured to draw a flow of air axially toward the second surface of the plate on rotation of the fan; the first plurality of blades are straight blades that extend radially across the first surface of the plate; the second plurality of blades are straight blades that extend radially across the second surface of the plate; and a ring connects the second plurality of blades.

15. A fan having a center axis of rotation, the center axis defining axial and radial directions, the fan comprising: a radially oriented plate having axially opposite first and second surfaces; a first plurality of blades on the first surface of the plate, the first plurality of blades being configured to draw a flow of air axially toward the first surface of the plate on rotation of the fan; a second plurality of blades on the second surface of the plate, the second plurality of blades being configured to draw a flow of air axially toward the second surface of the plate on rotation of the fan; the plate is circular and has a circular perimeter edge; the first plurality of blades extend radially outward to distal ends of the blades that are spaced radially outward from the plate perimeter edge; and a ring connects the second plurality of blades.

16. The fan of claim 14, wherein:
the plate is circular and has a circular perimeter edge; and,
the second plurality of blades extend radially outward to distal ends of the blades that are spaced radially outward from the plate perimeter edge.

17. The fan of claim 16, wherein:
a ring connects the distal ends of the second plurality of blades and the ring is spaced radially outward from the plate perimeter edge leaving a void between the ring and the plate perimeter edge.

18. The fan of claim 17, wherein:
the ring has an oblique cross section relative to axis of rotation that angles radially outward from the second surface of the plate as it extends axially away from the plate.

19. The fan of claim 12, wherein:
the first plurality of blades, the second plurality of blades and the plate are one monolithic piece.

20. A fan having a center axis of rotation, the center axis defining axial and radial directions, the fan comprising; a radially oriented plate having axially opposite first and second surfaces; a first plurality of blades being configured to draw a flow of air axially toward the first surface of the plate on rotation of the fan; a second plurality of blades on the second surface of the plate, the second plurality of blades being configured to draw a flow of air axially toward the second surface of the plate on rotation of the fan; and, the first plurality of blades extend radially straight from a center shaft hub; and a ring connects the second plurality of blades.

21. A fan having a center axis of rotation, the center axis defining axial and radial directions, the fan comprising:
a plurality of blades radiating outwardly from the center axis of the fan and circumferentially, spatially arrange around the center axis of the fan; and,
an annular ring intersecting the plurality of blades, the annular ring having axially opposite first and second edges and a cross-section that angles obliquely away from the center axis as the cross-section extends from the first edge of the ring to the second edge of the ring.

22. The fan of claim 12, wherein:
the annular ring cross-section is oriented obliquely relative to the center axis.

23. A fan having a center axis of rotation, the center axis defining axial and radial directions, the fan comprising:
a plurality of blades radiating outwardly from the center axis of the fan and circumferentially, spatially arranged around the center axis of the fan;
an annular ring intersecting the plurality of blades, the annular ring having a cross-section that is oriented at an angle relative to the center axis; and,
the annular ring has an axial dimension and the plurality of blades each have an axial dimension that is larger than the annular ring axial dimension.

24. The fan of claim 23, wherein:
each blade of the plurality of blades has axially opposite first and second edges;
the annular ring has axially opposite first and second edges, and the annular ring second edge intersects the second edges of the plurality of blades and the annular ring first edge is spaced axially from the first edges of the plurality of blades.

25. The fan of claim 24, wherein:
the annular ring cross-section tapers radially outward as the annular ring extends from the first edge to the second edge.

26. The fan of claim 22, wherein:
a plurality of voids pass between adjacent blades and radially within the ring.

27. The fan of claim 23, wherein:
the plurality of blades extend radially outward to distal ends of the blades that are spaced radially outward from the annular ring.

28. The fan of claim 22, wherein:
the plurality of blades and the annular ring are one monolithic piece.

29. The fan of claim 22, wherein:
the plurality of blades are straight, radial blades that are configured to push a flow of air radially outward away from the axis of rotation of the fan.

30. An apparatus for cooling a dynamoelectric device on operation of the device, the apparatus comprising:
a fan having a center axis of rotation, the center axis defining axial and radial directions, the fan having a plurality of blades radiating outwardly from the center axis of the fan and circumferentially arranged around the center axis of the fan;
an end shield having an interior volume containing the fan for rotation of the fan about the center axis in the interior volume, an inner wall spaced radially outward from the fan center axis and extending around the end shield interior volume, a sidewall spaced radially outward from the inner wall and extending around the inner wall, and a plurality of vent channels positioned radially outside the inner wall and radially inside the side wall and communicating the end shield interior volume with an exterior environment of the end shield.

31. An apparatus for cooling a dynamoelectric device on operation of the device, the apparatus comprising:
a fan having a center axis of rotation, the center axis defining axial and radial directions, the fan having a plurality of blades radiating outwardly from the center axis of the fan and circumferentially arranged around the center axis of the fan;
an end shield having an interior volume containing the fan for rotation of the fan about the center axis in the interior volume, an inner wall spaced radially outward from the fan center axis and extending around the end shield interior volume, a side wall spaced radially outward from the inner wall and extending around the inner wall, and a plurality of vent channels passing between the inner wall and the side wall communicating the end shield interior volume with an exterior environment of the end shield; and, the fan is adapted for attachment to a shaft of a dynamoelectric device to be rotated by the device and the end shield inner wall is adapted for attachment to the dynamoelectric device whereby the vent channels are positioned to direct a flow of air created by rotation of the fan from the end shield interior volume through the vent channels and over the dynamoelectric device.

32. The apparatus of claim 31, wherein:

the vent channels are configured to direct a flow of air axially through the vent channels.

33. The apparatus of claim 31, wherein:

the plurality of vent channels are circumferentially arranged around the end shield.

34. The apparatus of claim 31, wherein:

the end shield, the inner wall and the side wall are one monolithic piece.

35. An apparatus for cooling a dynamoelectric device on operation of the device, the apparatus comprising:

a fan having a center axis of rotation, the center axis defining axial and radial directions, the fan having a plurality of blades radiating outwardly from the center axis of the fan and circumferentially arranged around the center axis of the fan;

an end shield having an interior volume containing the fan for rotation of the fan about the center axis in the interior volume, an inner wall spaced radially outward from the fan center axis and extending around the end shield interior volume, a side wall spaced radially outward from the inner wall and extending around the inner wall, and a plurality of vent channels passing between the inner wall and the side wall communicating the end shield interior volume with an exterior environment of the end shield; and, the plurality of blades are straight, radial blades that are configured to push a flow of air radially outward away from the fan axis of rotation and toward the vent channels.

36. An apparatus for cooling a dynamoelectric device on operation of the apparatus comprising:

a fan having a center axis of rotation, the center axis defining axial and radial directions, the fan having a plurality of blades radiating outwardly from the center axis of the fan circumferentially arranged around the center axis of the fan;

an end shield having an interior volume containing the fan for rotation of the fan about the center axis in the interior volume, an inner wall spaced radially outward from the fan axis and extending around the end shield interior volume, a side wall spaced radially outward from the inner wall and extending around the inner wall, a plurality of vent channels passing between the inner wall and the side wall communicating the end shield interior volume with an exterior environment of the end shield; and, the fan has an annular ring that intersects the plurality of blades and the annular ring has a cross-section that is angled relative to the fan center axis to direct a flow of air by rotation of the fan toward the vent channels.

* * * * *

UNITED STATES PATENT AND TRADEMARK OFFICE
CERTIFICATE OF CORRECTION

PATENT NO. : 6,514,052 B2
DATED : February 4, 2003
INVENTOR(S) : Peter K. Bostwick It is certified that error appears in the above-identified patent and that said Letters Patent is hereby corrected as shown below:

<u>Column 7, lines 60-67 through Column 8, lines 1 and 2,</u>
Claim 2 is corrected as follows:
2. A fan having a center axis of rotation, the center axis defining axial and radial directions, the fan comprising:

a first plurality of blades on a first axial side of the fan, the first plurality of blades being configured to draw a flow of air in a first direction axially toward the first axial side of the fan on rotation of the fan;

a second plurality of blades on a second axial side of the fan that is opposite the first axial side of the fan, the second plurality of blades being configured to draw a flow of air in a second direction, opposite the first direction axially toward the second axial side of the fan on rotation of the fan; and a plate separating the first plurality of blades from the second plurality of blades wherein a second plurality of blades extending radially outward to distal ends of the second plurality of blades; and, a ring connects the second plurality of blades.

<u>Column 9,</u>
Lines 39-43, claim 18 is corrected as follows:
18. The fan of Claim 17, wherein:

the ring has an oblique cross section relative to the axis of rotation that angles radially outward from the second surface of the plate as it extends axially away from the plate.

<u>Column 12,</u>
Lines 13-33, claim 36 is corrected as follows:
36. An apparatus for cooling a dynamoelectric device on operation of the device, the apparatus comprising:

a fan having a center axis of rotation, the center axis defining axial and radial directions, the fan having a plurality of blades radiating outwardly from the center axis of the fan and circumferentially arranged around the center axis of the fan;
an endshield having an interior volume containing the fan for rotation of the fan about the center axis in the interior volume, an inner wall spaced radially outward from the fan center axis and extending around the endshield interior volume, a side wall spaced radially outward from the inner wall and extending around the inner wall, a plurality of vent channels passing between the inner wall and the side wall communicating the endshield interior volume with an exterior environment of the endshield; and,

UNITED STATES PATENT AND TRADEMARK OFFICE
CERTIFICATE OF CORRECTION

PATENT NO. : 6,514,052 B2
DATED : February 4, 2003
INVENTOR(S) : Peter K. Bostwick It is certified that error appears in the above-identified patent and that said Letters Patent is hereby corrected as shown below:

<u>Column 12 (cont'd)</u>,
the fan has an annular ring that intersects the plurality of blades and the annular ring has a cross-section that is angled relative to the fan center axis to direct a flow of air created by rotation of the fan toward the vent channels.

Signed and Sealed this

Nineteenth Day of August, 2003

JAMES E. ROGAN
*Director of the United States Patent and Trademark Office*